United States Patent [19]

Harris

[11] 4,362,759
[45] Dec. 7, 1982

[54] METHOD OF PRODUCING A SLURRY FROM PEANUTS AND CROP FOODS

[75] Inventor: Hubert Harris, Auburn, Ala.

[73] Assignee: Peanut Research & Testing Labs., Inc., Albany, Ga.

[21] Appl. No.: 322,972

[22] Filed: Nov. 19, 1981

Related U.S. Application Data

[60] Division of Ser. No. 80,581, Oct. 1, 1979, Pat. No. 4,302,111, which is a continuation-in-part of Ser. No. 57,741, Jul. 16, 1979, abandoned, which is a continuation of Ser. No. 899,368, Apr. 24, 1978, abandoned.

[51] Int. Cl.³ .............................................. A23L 1/36
[52] U.S. Cl. .................................. 426/632; 426/486; 426/507; 426/519
[58] Field of Search ............... 426/632, 506, 507, 511, 426/517, 519, 486

[56] References Cited

U.S. PATENT DOCUMENTS 3,901,983 8/1975 Matsunaga ........................... 426/632
4,177,296 12/1979 Mochizuki et al. ................. 426/632

FOREIGN PATENT DOCUMENTS 861445 1/1971 Canada ................................ 426/632

Primary Examiner—Raymond N. Jones
Assistant Examiner—George C. Yeung
Attorney, Agent, or Firm—Morse, Altman, Oates & Dacey

[57] ABSTRACT

Crop foods such as peanuts, soybeans, peas, and the like, are ground and processed in a rapid, continuous, in-line production system. The food material is converted into a thermally processed slurry rapidly by mixing the ground food with hot water and steam and then quickly cooling the slurry, preferably in a vacuum chamber. The heat treatment stops the activity of enzymes which normally produce undesirable flavors and odors in mixtures of water and ground peanuts and other foods. The rapid cooling treatment prevents damage to protein content and simultaneously strips away any raw peanut flavor that may have developed. The continuous process produces a slurry of peanuts, or the like, without the characteristic raw peanut flavor, and the bland slurry can be further processed by drying to produce a useful food product such as flour, food extender, or the like.

The apparatus includes a feed pump for extruding ground nuts onto a screen in a primary mixing chamber into which steam and water are fed selectively to form the slurry. A secondary mixing chamber connects to the primary chamber and includes a rotary pump that both blends the slurry and advances it towards a vacuum chamber where the slurry is rapidly cooled.

13 Claims, 3 Drawing Figures

METHOD OF PRODUCING A SLURRY FROM PEANUTS AND CROP FOODS

CROSS-REFERENCE TO RELATED APPLICATION

This is a division of application Ser. No. 080,581, filed on Oct. 1, 1979, now U.S. Pat. No. 4,302,111, which is a continuation-in-part of U.S. Application Ser. No. 057,741 filed July 16, 1979, now abandoned, which is a continuation of Ser. No. 899,368, filed Apr. 24, 1978 and entitled "Method Of Thermally Processed Food Slurries " now abandoned.

BACKGROUND OF THE INVENTION

1. Field of the Invention

This invention relates generally to food processes and equipment and more particularly is directed towards a new and improved slurry process involving instant hydration and heating of ground peanuts, and the like, and apparatus for carrying out the process on a rapid, continuous, in-line basis.

2. Description of the Prior Art

Certain types of crop products, such as peanuts, soybeans, peas, etc. are rich in protein and, as such, are desirable not only as primary food products, but also as processed foods. However, problems are sometimes encountered which adversely affect the end product. These problems are particularly difficult with respect to processed peanuts because of the presence of the strong, raw peanut flavor that is produced in aqueous slurries of raw ground peanuts using conventional techniques. Heretofore, there has been no means available to remove fully the peanut flavor and odor from an aqueous slurry of raw ground peanuts, or the like, in a low cost, efficient and continuous manner and to do so without damaging the protein content thereof.

SUMMARY OF THE INVENTION

This invention features the method for continuously producing thermally processed crop food slurries, comprising the steps of grinding or otherwise reducing a crop food product such as peanuts into a mass of small sized particles, extruding the mass into a ribbon, mixing the ribbon with steam and/or water for the instant hydration and simultaneous heating of the mass to form a slurry in which the enzyme action is stopped. Shortly thereafter the heated slurry is quickly cooled, preferably by introducing the slurry to a low pressure atmosphere where the steam, together with any entrained flavor-carrying vapors, are flashed off and separated from the slurry. This step quickly cools the slurry to prevent damage to the protein content of the peanut material. The slurry may be further processed as by drying the same into a flour or the like.

The apparatus for carrying out the process includes a feed pump for extruding the ground nuts in a ribbon onto a screen in a primary mixing chamber connected to steam and water sources which combine with the peanut ribbon to form a heated slurry. Communicating with the primary chamber is a secondary mixing chamber, which includes a combination pump and blender to further mix the water and ground nuts received from the primary chamber. A holding tube connects the secondary mixing chamber to a vacuum chamber wherein the slurry is held for a time sufficient to raise the temperature of the nut content to the desired temperature to stop the enzyme action initiated by the water. Any raw peanut flavor components that may have developed are then flashed off in the vacuum chamber with little or no denaturation of the protein content of the nut material. The vacuum chamber collects the slurry which now has a bland taste by virtue of the removal of the flavor component, and the slurry may be transferred through an optional colloid mill to a slurry holding tank prior to further processing.

DETAILED DESCRIPTION OF THE PREFERRED EMBODIMENTS

While the slurry process and related apparatus disclosed herein may be used to advantage with respect to slurries of various types of food crops, it is particularly useful in the forming and processing of peanut slurries. Accordingly, the following description and examples will be directed towards the process and apparatus as they pertain to peanut slurries, although other food crops could be substituted for the peanut material.

In general, the process involves heating and blending of ground peanuts for the continuous, in-line production of peanut slurries. The thermal and thermodynamic treatments employed in this process result in desirable changes in the chemical and physical properties of the product. The rapidity of the process makes it possible to obtain these desirable changes with a minimum of undesirable changes in the product, such as heat denaturation of protein.

The preparation of peanut slurries used in the production of dry peanut flour, or the like, provides a specific example which demonstrates the process, the system, and the advantage thereof. When aqueous slurries of raw, ground peanuts are prepared by conventional batch mixing techniques without heating the slurry, conditions are ideal for the development of an undesirable raw peanut flavor. This flavor component results from a chemical change that occurs rapidly when water is mixed with the ground peanuts. Enzymes present in the peanuts catalyze this chemical change. The use of heat in the batch method to inactivate the enzymes results in over-exposure of the slurry to heat. Such a condition causes excessive denaturation of the protein as well as other kinds of heat damage of the product.

In accordance with the present invention, the foregoing problems are solved by means of an efficient, in-line operation in which the ground peanuts are instantly mixed with pre-heated water and sparge steam is introduced to boost the slurry temperature to or above the level required to inactivate the enzymes. By simultaneously forming the slurry and rapidly raising its temperature, there is very little time for the raw peanut flavor to develop before the enzymes are inactivated. The slurry is then quickly cooled, preferably by flashing it into a vacuum system that strips away any raw peanut flavor that may have developed and cools the slurry so quickly that there is very little time for heat damage to occur to the protein or cause other undesirable effects.

Figure 1:
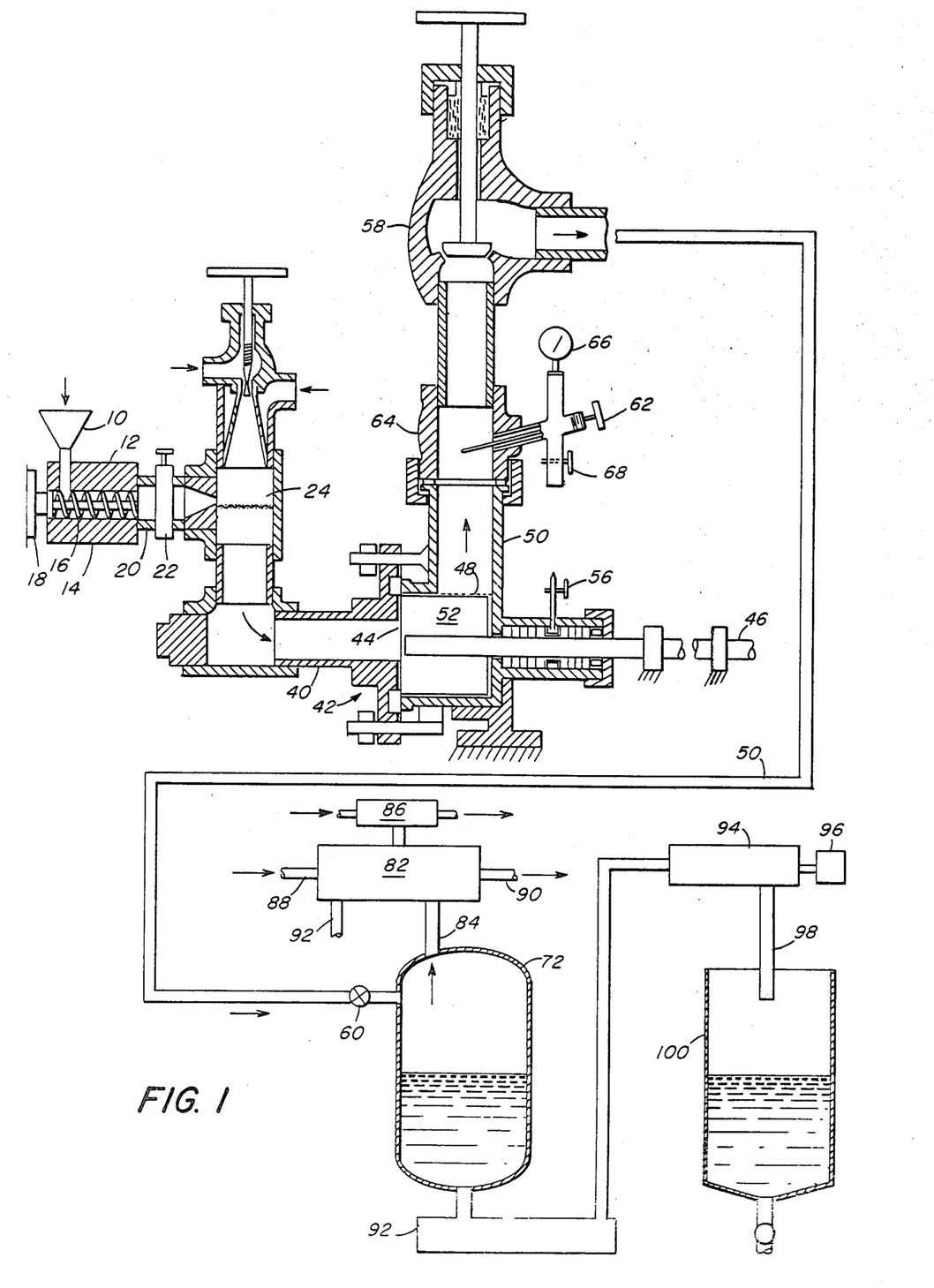
FIG. 1 is a diagram of an in-line slurry processing system made according to the invention.

Referring now more particularly to the drawings and to FIG. 1 in particular, the process as it relates to peanut slurries and the apparatus for carrying out the process will be described in detail. The apparatus comprises an in-line system adapted to produce and process peanut slurries on a continuous, mass production basis.

In order to make the slurry, deskinned (blanched) peanuts are first ground in a suitable mill (not shown). Several types of mills have proven to be satisfactory for this purpose. The essential requirement is that the product particle size be small enough for the rapid penetration of heat which will be applied in the system. The amount of free oil in the ground peanut is of little if any significance. Mills that are used in the manufacture of peanut butter, as well as those that produce a raw ground peanut product with physical properties similar to those of peanut butter have proven to be satisfactory. One such mill is the Bauer peanut butter mill which produces enough frictional heat during the grinding operation to increase the ground product temperature to approximately 150° F. This temperature increase is advantageous in further heating during the slurry process and for improvement in the pumping quality of the ground peanuts.

The ground peanuts are fed into the system through a hopper 10 that delivers the ground peanuts into a product feed pump 12. The pump 12 may be any one of a variety of pumps but should be capable of handling the product to be processed, which, in this instance, if of a pasty character, and maintain a constant flow rate into the system against the processing pressures at which the system is operated. Certain models of the Moyno pump have proven to be satisfactory for handling ground peanuts and many other products.

In the illustrated embodiment, the pump 12 includes a housing 14, an auger 16 rotatably mounted therein and driven by means of a variable speed drive 18. The ground peanuts may be fed into the pump 12 by gravity through the hopper 10 or they may be piped in by means of another pump, auger feed or other device. The pump 12 delivers the ground peanuts through a discharge conduit 20 optionally equipped with a throttling valve 22 and then extruded in ribbon form through a slot opening 21 in a nozzle 23 into a primary mixing chamber 24. The feed rate of the ground peanuts into the mixing chamber 24 is controlled by regulation of the variable drive 18 which determines the speed of the rotor 16 and also by adjusting the throttling valve 22.

Figure 2:
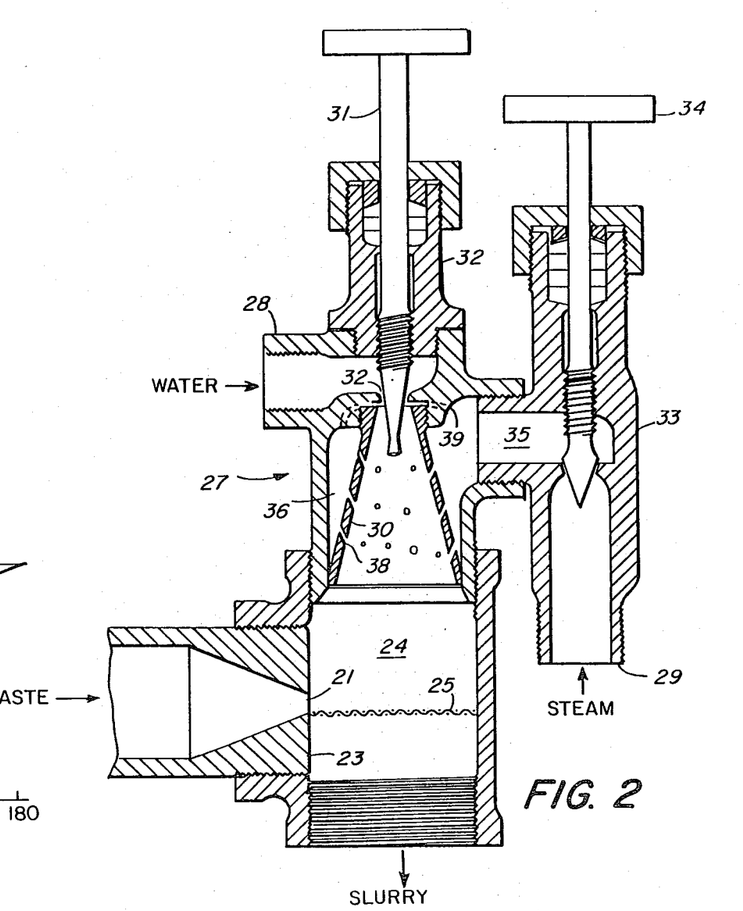
FIG. 2 is a sectional view in side elevation showing details of the primary mixing chamber, and, FIG. 3 is a graphic representation of the properties of saturated steam.

Inside the chamber 24 a foraminous support in the form of a rigid screen 25 is mounted directly below the lower edge of the slot opening 21 to receive the ribbon of peanut paste being extruded from the nozzle 23. The screen 25 is mounted horizontally within the chamber 24 which is generally cylindrical and mounted upright, perpendicular to the conduit 20 and directly below a steam and water head assembly 27. The head assembly 27 is provided with a water inlet 28 and a steam inlet 29 which combine at a conical infusion cone 30 mounted directly above the primary mixing chamber 24. The water inlet 28 is connected with the upper end of the infusion cone 30 with the flow of water being controlled by means of a valve 31, the stem of which extends through a valve opening 32 into the upper end of the infusion cone 30. Steam is fed through the inlet 29, past a steam control valve 33 having a valve handle 34 for controlling the amount of steam flowing through a passage 35 into a somewhat annular chamber 36 surrounding the infusion cone 30. The infusion cone 30 is formed with a plurality of downwardly and inwardly directed orifices 38.

In operation, water either cold or pre-heated, is introduced through the water inlet 28 and through the valve opening 32 into the upper end of the infusion cone 30 where it forms a strong spray in the shape of a cone. The axis of the cone is substantially perpendicular to the horizontally disposed screen 25 on which the ribbon of ground peanut material is supported. The chamber 24 itself is operated at a pressure which is maintained at a level substantially below the pressures of incoming ground peanuts, the stem and the water. Whether the water coming through the valve 32 is used alone or is combined with steam mixing with the water through the infusion cone 30, a conically shaped discharge of water and/or steam is developed which is substantially perpendicular to the screen 25. This discharge drives the ribbon of peanut paste against and through the screen, thus developing a churning and screening action. This process forms the slurry by breaking up glomerates of ground peanuts and emulsifying the oil. The water introduced to the spray head assembly may pass through a flow meter before entering the feed valve 32. The feed valve regulates the rate of flow by throttling and to deliver the water as a strong spray having the shape of a solid cone. To accomplish these results the water is supplied to the valve in a comparatively high constant pressure and the valve needle and seat are designed to form a cone-shaped spray which impinges against the entire surface of the screen 25. This valve is also designed to produce the strong cone-shaped spray when regulated for different flow rates over a wide range. A strong spray will be maintained whether making heated or unheated slurries.

Heated slurries can be made by supplying water to the valve 32 that has been pre-heated to a suitable temperature, by supplying cold water and heating it with sparge steam from the steam infuser or by supplying water pre-heated to a lower temperature and supplementing the heat with sparge steam. In all cases the designed equilibrium temperature in the slurry as well as the production rate and peanut solid contents of the slurry are obtained by regulating flow rates and temperature of the peanut material, water and steam.

Another feature of the valve 32 is that of energy saving. This is brought about by the fact that the energy inherent in water from a pressurized source, such as an elevated tank, is utilized in forming the strong spray which aids greatly in making the slurry. The flow rate is quickly and acurately regulated by turning the valve handle to maintain the flow rate desired as indicated by the flow meter. Regardless of flow rate the water is still at full pressure as it passes through the valve and forms the spray.

Other methods may also be used to produce the water spray used to make the slurry. For example, a conventional throttling valve could be used in the water supply line and an orifice or spray head installed to provide the water spray. In this case it would be desirable to use a pump between the throttling valve and orifice in order to regain the water pressure lost in passing through the throttling valve. Flow rate then can be regulated by changing orifices and/or varying water pressure.

Another feature of the primary mixing chamber 24 is that of the comparatively low pressure maintained in the chamber. This low pressure makes it possible to deliver sparge steam into the chamber at a relatively higher rate without the steam pressure building up to a level that water flow rate is reduced or completely shut off. The latter is a problem often encountered when sparge steam is used without a substantial pressure differential between the steam source and the water or other material being heated. In the present system, the pressure differential together with the configuration of the steam infusion cone 30, provide for adequate control of the steam flow over a wide range of flow rates.

The screen 25 of the preferred embodiment may be open mesh woven screen of stainless steel, for example, or may be in the form of a perforated plate. In either event, it has been found in practice that the screen openings should be within range of ⅛ to 1 inch wide. The screen also should be mounted for exchanging one screen for another, either of the same mesh or one of a different mesh size. The mounting of the screen 25 may be done by various known mounting means such as forming an annular shoulder to support the under edge of the screen and securing the upper edge by means of a snap ring, threaded ring, or the like.

The cone 30 is also replaceable in order to exchange one cone for another, either of the same or different material or different number, size or distribution of orifices 38. As shown, the cone 30 is provided with a threaded annular neck at the apex which threads into a cooperating threaded collar in the body of the valve. The number of orifices employed in the particular cone may vary, but in practice a cone with eight or ten orifices has been found satisfactory.

While it is preferred that the water/steam be introduced directly above and perpendicular to the ribbon peanut material supported by the underlying screen, other arrangements may also be used. For example, the water and steam mix may be delivered at an angle to the screen offset from the vertical or the screen itself may be oriented in the vertical plane with the ribbon being delivered from a vertically oriented extrusion nozzle. In such case, the water and steam may be introduced from a horizontal position in order to provide the desired mixing action.

It was found that in making unheated slurries, air was drawn into the cone due to a partial vacuum being formed in the apex of the cone. The vacuum resulted from high velocity of the incoming water. Air rushing in from the base of the cone to relieve the vacuum caused the spray of water to go into a whirling motion and lose most of its force before reaching the screen. This problem diminished as the slurry temperature increased and disappeared when the slurries were made at temperatures above 180° F. This is because of increased vapor pressure of water at high temperature.

In making unheated slurries the vacuum problem may be eliminated by maintaining a partial vacuum in the primary mixing chamber and in the conduit to the secondary mixing chamber. Another solution to the problem is to relieve the vacuum by providing a source of air to the apex of the cone. This is achieved by providing ports 39 between the steam infusion chamber 36 and the apex of the cone. Air entering the steam chamber from the base of the cone through the steam orifice moved through the ports into the apex of the cone to relieve the vacuum and prevent the turbulence in the water spray.

The steam is supplied through the line 29. When processing foods and other products in which impurities in the steam may cause problems of contamination, it is necessary to employ boiler maintenance practices that will provide culinary steam or to employ suitable treatments to purify the steam after it leaves the boiler. Superheated steam may be used with a resulting higher heat content per unit of steam condensed as compared with saturated steam. However, saturated steam has been found to be very satisfactory and it is doubtful that the additional heat units available in superheated steam would be economically justified in view of the cost of superheating.

From the primary mixing chamber 24, the slurry flows a short distance downwardly and makes a 90° change of direction through a passage 40 into a secondary mixing chamber 42. The 90° change of direction of flow aids in further mixing of the materials although a straight line flow or any feasible change of flow direction may be used.

Final mixing and blending of the slurry takes place in the secondary mixing chamber 42. In the illustrated embodiment, the secondary mixing chamber 42 is comprised of a centrifugal type pump equipped with an impeller 44 driven by a shaft 46 connected to a motor in a variable speed drive system. The impeller 44 is axially aligned with the conduit 40, which is on the suction side of the pump, while a screen 48 is mounted across the discharge side thereof into a conduit 50. Impeller 44 is designed primarily to mix and blend the slurry and also to provide pumping action in order to boost the flow of the slurry through the system.

In the preferred embodiment, impeller 44 is provided with three blades 52 which are curved with respect to the axis of rotation. The curve increases sharply towards the pump intake which provides shearing action as the impeller blade strikes the slurry and pulls it into the pump chamber. The pump chamber is relatively long with respect to its diameter. This provides more surface area on the discharge screen 48. The impeller blades also curve backward with respect to the direction of rotation. Finally, the blades rotate at close clearance across the discharge screen. In practice, the screen 48 is of a smaller mesh that that of the screen 25 employed in the primary mixing chamber. Typically, the mesh of the screen 48 is in the range of 1/16 to ¾ of an inch. Final blending and oil emulsification are achieved as the impeller blades drive the slurry through the secondary screen 48.

In the preferred embodiment of the invention, the variable speed drive for the pump may include a varibale speed motor or a belt and variable pitch pulley, for example, to provide impeller rotation speeds ranging from 1700 to 3600 rpm. Operated at 2800 rpm, the pump will develop a pressure differential of approximately 12 pounds per square inch between intake and discharge. This operating condition is used in the examples shown in Table I. Operated at the same speed and making an unheated slurry, the pump will develop approximately 18 inches of vacuum in the primary mixing chamber 24 when the slurry is discharged to the atmosphere. This partial vacuum together with the vacuum relief ports 39 completely eliminate the problem of water turbulence in the primary mixing chamber 24 when making an unheated slurry.

The pump 44 includes the drive shaft 46 which passes through a shaft seal assembly 54 comprised of two sets of Teflon packing rings separated by a stainless steel ring designed to deliver water in both directions to lubricate the packing. Flow of the water is regulated at a low rate by means of a throttling valve 56.

The secondary pump is designed for a slurry displacement capacity as set forth in Table I and substantially exceeds the rate of slurry production in the primary mixing chamber. The purpose of this is to maintain a partial void in the area of the screen 25 as an aid to the action of the water spray against the screen. Without this partial void the screen would become flooded with a slurry and the churning action of the water spray against the screen would be less effective in making the slurry. Depending upon process conditions, the void may be in the form of a partial vacuum, or it may be filled with water vapor or steam.

In a displacement test with a full intake pipe water supplied to the pump at zero gauge pressure, a pump speed of 2200 rpm and a discharge pressure of 2.5 psi, the pump discharge rate was 7680 pounds per hour. This is approximately twice the maximum slurry production capacity of the system. While the pump displacement varies with pressure differential, processing temperature and pump speed, it is capable of maintaining the partial void in slurry production operations.

While the pump used in the secondary mixing station is preferred, other centrifugal pumps are available that will provide satisfactory results. By way of example, certain models of Tri-Clover food pumps may be used to advantage. However, when such pumps are used, it is advisable to modify them by installing a screen through which a slurry is discharged.

From the secondary mixing chamber 42, the slurry passes into a holding or dwell line 50. This line is of a length and diameter selected to provide a controlled holding time as required for suitable penetration of heat into the slurry particles. The line is provided with a suitable discharge valve 58 which introduces another 90° change of direction in the flow of the slurry. In the event that the slurry is to be discharged by flashing into a vacuum or from an elevated pressure to the atmosphere, an automatic spring-loaded flash valve 60 is employed.

The dwell line 50 is provided with an in-line thermometer 62 mounted in a fitting 64 below the valve 58 and above the secondary screen 48. Also included with the fitting 64 is a pressure gauge 66 and a slurry drain valve 68.

From the secondary mixing chamber the slurry is pumped into the holding line which discharges into a vacuum chamber 72. The line 50 may be defined as a holding or dwell line and is of a length and diameter selected to provide a controlled holding time as required for suitable penetration or heat into the slurry particles to stop the enzyme action throughout each particle. A holding time 1 to 60 seconds, and preferably 10 to 12 seconds, has been proven to be satisfactory in making deflavored peanut slurries. Shorter or longer holding periods may be used depending upon the product being processed and the results desired.

The slurry passes through the valve 60 into the vacuum chamber 72. Since the chamber 72 is operated at a vacuum, the slurry will flash as it enters the chamber. This flashing action instantly cools the product and removes any volatized flavor components such as the raw peanut flavor. These flavors are drawn out with the flash water vapor that leaves the chamber during the process. The level of the vacuum in the chamber 72 is regulated to obtain the results desired. This may vary from very little up to 28 inches or more of vacuum. In making deflavored peanut slurries, a vacuum of the order of 24 to 28 inches has been found to be effective. Various means may be provided for maintaining the vacuum in the chamber 72 and, in the illustrated embodiment, a vapor condenser 82 is connected to the chamber 72 by means of a vapor removal line 84. A vacuum pump 86 is connected to the condenser as shown. Cooling water may pass through the condenser 82 through inlet and outlet lines 88 and 90 with condensed liquid being removed by a drain line 92 connected to a condensate pump (not shown). The vacuum pump may be one of a variety of units used for this purpose such, for example, a steam ejector pump. The cooling water from the condenser may also be used to provide the makeup water for the primary mixing valve, if desired.

While vacuum flashing is preferred as a means for quickly cooling the slurry, other techniques may be used to advantage such as cooling chambers, refrigerated conduits, rotating chilled drums on which the slurry is deposited, cooling air jets directed against or into the slurry, and the like.

The liquid slurry collects in the bottom of the vacuum chamber 72 and then may be transferred by means of a vacuum discharge pump 92 to a colloid mill 94 operated by a motor 96. The mill 94 may be used for further reducing the size of the peanut particles and/or for better emulsification of oil content, as needed. Depending upon specific requirements, the slurry may also be subjected to a suitable hemogenization treatment, not illustrated. This optional treatment may be employed in lieu of or following the colloid grind treatment, or at another point in the processing line.

Finally, the slurries pass through a line 98 to a holding tank 100 serving as a slurry reservoir. The slurry may be stored in the tank 100 for whatever period is required or it may be immediately passed onto further processing steps. If the slurry is being converted into a dry peanut flour, for example, it is delivered to a suitable drying apparatus, such as a spray dryer, drum dryer, or the like. Various types of drying equipment are available for the continuous drying of the slurry on a commercial basis. Freeze drying equipment, belt dryers, spray dryers, drum dryers, or the like, may be used. In drying the slurry it may be desirable to form it into flakes by first forming the slurry into a film or strips of various configurations and then drying it. In drum drying, the slurry is passed in a film over a heated drum surface which is rotating and serves to provide a continuous drying operation. Alternative measures may include radiant energy and in this regard microwave energy may be used to advantage to dry and/or cook the product.

In making various slurries from peanuts or other foods, it is often desirable to incorporate one or more food additives into the mixture. Antioxidants, surfactants, emulsifiers, sequestrants, anti-coagulants, flavoring and coloring agents, starches and protein extenders are examples of such ingredients. The slurry system disclosed herein lends itself to the incorporation of additives. Materials in dry form like powder, meal, flakes or granules are combined with the peanuts as they are fed into the grinding mill using an auger type metering device. Liquids may also be added at this location using a liquid metering pump. Such pumps can be equipped for applying the material as a spray which provides faster and better incorporation with the peanuts. Metering augers and pumps are available for accurately controlled additions of these materials at various levels.

Liquids and powders may also be combined with a ground paste of peanuts or other material before feeding it to the primary mixing chamber. A convenient location for this addition is the hopper 10 that feeds the pump 12. When the materials are added at this location faster incorporation with the ground paste is achieved by installing a suitable mixer or blender in the hopper, for example, a Lightnin mixer. However, this usually is not essential since the slurry is thoroughly mixed in the succeeding in-line process. Other locations in the slurry line for adding liquid by use of a positive displacement metering pump are: (1) in the supply water inlet 28 before it is sprayed into the primary mixing chamber 24, (2) into the water spray in the primary mixing chamber, and (3) at a suitable point in the conduit 40 between the primary and secondary mixing chamber.

In the operation of the present invention, full fat, raw, blanched peanuts, ground to a paste-like consistency were used. Grinding for laboratory tests was done with a high speed Model 160-X Alpine pin mill operated at 14,000 rpm. Grinding may also be done in a Bauer mill for pilot and commercial operations.

The pump 12 is used for feeding the paste into the primary mixing chamber and may be a Model 1L3 Moyno pump. It is equipped with a variable speed drive providing rotor speeds of 40 to 290 rpm. This provides pumping rates of 90 to 1080 pounds of paste per hour at approximately 50 psi pressure. In practice, it is desirable to use standard pipes, fittings, valves, etc. wherever feasible. By way of example, the primary mixing chamber 24 and the conduit 48 are made from standard 1½" pipe fittings. A chamber of this size, although small, performs well in mixing and heating the slurries at rates of above 3000 pounds per hour.

The secondary mixing chamber essentially is a special pulper type pump and the chamber for the pump is constructed from standard 4" stainless steel tubing. Internal dimensions of the pump chamber are 3¾" in diameter by 3½" in length.

Numerous test operations were made on peanut slurries in this system involving a wide range in slurry processing temperature dwell time, peanut solids level and production rate, which has been summarized in Tables II and III. The system described herein is capable of producing slurry at temperatures ranging from no heat up to 280° F., and holding periods ranging from one second to 10 minutes. A maximum heat level of 320° F. is obtainable by using a 2-L-4 Moyno pump to replace the 1-L-3 model and boosting the feed water pressure to 120 psi. In commercial test with the present system, peanuts have been processed at rates up to 1000 pounds per hour for the ground peanuts.

Different slurry processing treatments involve a range of pressures in the several areas of the in-line system. These pressures vary with temperatures and other factors. Generally, the pressure in a specific operation is relatively low in the primary mixing chamber 24 and conduit 48, somewhat higher in the slurry discharge conduit or holding pipe 70 and substantially higher in the pipes that supply ground peanuts, (or other materials) water and steam.

When making slurries at or above 212° F., the pressure in the primary mixing chamber 24 is determined largely by slurry temperature. This pressure is essentially the same as that of saturated steam at the processing temperature, except for a small increase that may result from air introduced by the peanuts, water and/or steam. When processing at temperatures below 212° F., the amount of the air in the chamber may be greater. This air does not present a problem in regulating temperature. The problem with the water spray caused by air and its solution has already been described above. Data on this is presented in Table I.

A pressure differential always exists between the primary mixing chamber 24 and the holding pipe 40. This differential tends to be greater at lower processing temperatures and at higher pump speeds as outlined on Table I. This differential should be maintained at not less than 2 psig in order to provide overriding pressure in the holding pipe 40 to prevent the formation of steam pockets in the pipe. A substantially higher differential exists when making a nonheated slurry or slurries heated within the range of 100° to 160° F. (Table I). If such slurries are discharged from the holding pipe 40 to the atmosphere or to a vacuum, the differential is still greater. Under these conditions, the absolute pressure in the primary mixing chamber may be well below that of the atmosphere. (Table I). As the slurry process temperature increases, the water vapor pressure also increases, which accounts for the reduced pressure differential between the primary mixing chamber and the holding pipe, (Table I).

As an example in making a slurry at a higher processing temperature under standard atmospheric conditions, a slurry process temperature of 250° F. would require 15 psig pressure in the primary mixing chamber 24 and at least 17 psig in the conduit 40. However, much higher pressures might be used in the holding pipe while maintaining the 250° F. process temperature if such high pressures are needed to meet special requirements. For example, a higher overriding pressure would be needed if the conduit 40 is in a vertical position, or if the added pressure is needed to force the slurry to a succeeding operation. A booster pump may be required if substantially higher pressures are needed.

Figure 3:
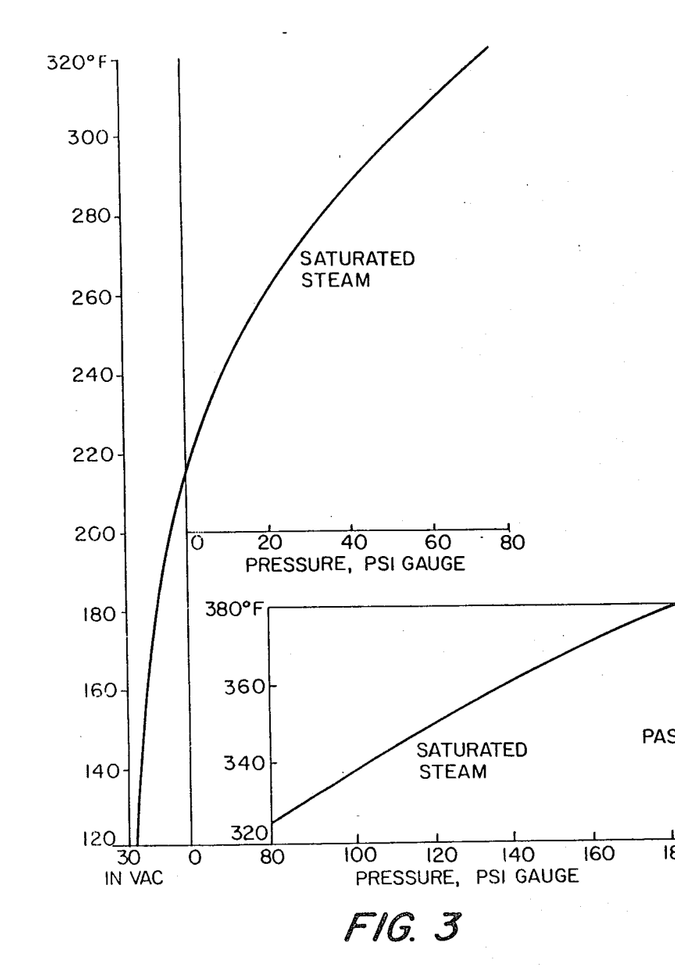

The temperature-pressure relation of saturated steam at standard atmospheric pressure is shown graphically in FIG. 3. This provides a guide for selecting suitable pressures in the conduit 40 for various heat levels. Correction for gauge pressure relation to steam temperature at elevations substantially above sea level are made by adding 0.5 psig for each 1000 feet altitude. In relating pressure to vacuum, a 1.0 inch vacuum gauge reading indicates that the absolute pressure is approximately 0.5 psi below that of the atmosphere.

The dwell time in the holding pipe 50 may vary greatly depending on specific processes, but usually is only of a few seconds duration. A dwell time of 10 to 12 seconds is suitable for making deflavored peanut slurries. However, dwell times ranging from less than one second to 10 minutes are attainable with this in-line system. For relative short dwell periods, the holding line 50 is, in practice, a pipe of suitable diameter connecting the slurry unit with the next succeeding operation. For longer dwell periods the pipes should be larger in diameter and/or it might extend for a suitable distance in a vertical direction and return to the next operation. For extremely long dwell periods the pipe might make two or more vertical passes. Another alternative is to arrange the pipe as horizontal passes to provide the length needed.

One holding pipe that was used for long dwell periods in experimental laboratory tests on slurries consisted of a standard 2" stainless steel pipe, 14' long. This pipe has a capacity of 19 pounds of slurry and provides dwell times ranging from 20 seconds at a production rate of 3,420 pounds of slurry per hour, to 120 seconds at a production rate of 570 pounds per hour. Holding pipes of lesser capacities were used for shorter holding periods.

The exact procedure for making a slurry depends upon the product and treatments desired. For example, heat treatments may or may not be used. When making peanut slurries to be spray dried and used as human food, it is usually desirable to heat the slurry sufficiently for deflavoring by a subsequent treatment such as vacuum flashing. However, too much heating has the adverse effect of destroying the antioxidative property of the product, especially when vacuum flashing is used. Flash heating of peanut slurries to 150° F. and vacuum flashing has proven to be effective in deflavoring without destroying the effects of natural antioxidents.

In practice, this slurry system will produce, instantly, the exact level of heating desired, from no heating to 280° F. (up to 320° F. by making equipment substitutions as already specified), while combining the peanuts, water, and additives (if used) in the exact proportions desired. To accomplish this the flow rates of materials into the primary mixing chamber 24 are accurately regulated by methods already described. The fact that the materials decrease substantially in pressure upon entering the chamber aids greatly in regulating flow rates.

For slurry process temperatures up to 280° F., pressures of 50 psi in the peanut supply line 20, 60 psi in the water supply line 28, and 95 psi in the steam supply line 29 have proven to be satisfactory. For slurry temperatures up to 320° F. it is necessary to make the equipment substitutions specified above. It is important that pressures do not fluctuate significantly in the supply lines and that these lines are large enough to prevent a significant decrease in line pressure.

While it is essential that the water supply be held at a constant temperature level, this temperature may range from that of cold tap water to several degrees above the process temperature. However, the use of higher water supply temperatures and less sparge steam tends to increase the slurry production capacity of the system.

An in-line water heater with thermostatic and pressurestatic regulators (not shown) has been designed and constructed for use in commercial tests. This heater provides a steady supply of feed water at the temperature and pressure levels needed in a specific slurry process and utilizes line pressure in the water supplied to the heater.

While the invention has been described with particular reference to illustrated embodiments and examples, numerous modifications thereto will appear to those skilled in the art without departing from the invention. For example, the use of steam for heating the feed water and/or the slurry can be eliminated if the feed water is separately heated to the desired temperature. Also, the system can be used to produce slurries at ambient temperatures by introducing unheated water to the mixing chamber. The resulting product would, however, retain the raw peanut flavor characteristic of a conventionally processed slurry.

Another alternative in using the apparatus is to eliminate entirely the introduction of water into the ground peanut material and to use only steam. The steam may be either saturated or superheated and the resulting material may be flashed into a vacuum or to the atmosphere. The preferred technique is to use superheated steam and flash the material into a vacuum. This will produce a deflavored peanut paste with a moisture level of about 5%. The ground peanuts that are subjected to steam only do not form into a slurry in the same manner as when water is included, but rather form into a somewhat liquified paste that can be pumped through the system much like the slurry.

TABLE 1

Water Heating and Pumping Tests in Slurry Unit Heating Chambers 24 and 42.[1]

| Pump impeller speed[3] R.P.M. | Water: Flow rate per hr.[1] Lb. | Water: Discharge temperature[2] °F. | Steam: Heat input per hr. 1000 B.T.U. | Steam: Pressure Line[2] p.s.i. | Steam: Pressure Diffuser (36) p.s.i | Pump pressure In take | Pump pressure Discharge p.s.i. |
|---|---|---|---|---|---|---|---|
|  |  |  |  |  |  | In. vac. |  |
| 2200 | 2280 | 80 | 0 | 95 | 0 | 14 | 0.1 |
|  | 2340 | 80 | 0 | 95 | 0 | 12 | 1.5 |
|  | 2340 | 100 | 47 | 95 | 0 | 12 | 1.5 |
|  | 2340 | 120 | 94 | 95 | 1 | 12 | 1.5 |
|  | 2300 | 140 | 138 | 90 | 10 | 11 | 1.5 |
|  | 2280 | 160 | 182 | 80 | 16 | 11 | 1.5 |
|  | 2280 | 180 | 228 | 72 | 22 | 9 | 1.5 |
|  | 2200 | 200 | 264 | 60 | 30 | 2 | 1.5 |
|  |  |  |  |  |  |  | p.s.i. |
|  | 1900 | 220 | 266 | 59 | 30 | 6 | 8 |
|  | 1680 | 240 | 269 | 59 | 30 | 12 | 14 |
|  | 1350 | 260 | 243 | 56 | 34 | 22 | 24 |
|  | 1090 | 280 | 216 | 60 | 40 | 32 | 35 |
|  |  |  |  |  |  | In. vac. |  |
|  | 1680 | 120 | 67 | 95 | 0.7 | 14 | 1.0 |
|  | 1080 | 140 | 65 | 92 | 5 | 16 | 0.5 |
| 2800[3] | 1200 | 120 | 48 | 95 | — | 18 | 1.0 |
|  | 1200 | 150 | 84 | 95 | — | 18 | 1.0 |
|  |  |  |  |  |  |  | p.s.i. |
|  | 1200 | 120 | 48 | 95 | — | 0 | 13 |
|  | 1200 | 150 | 84 | 95 | — | 0 | 12 |
|  | 1200 | 180 | 120 | 90 | — | 0 | 11 |
|  | 1200 | 210 | 156 | 85 | — | 0 | 9 |
|  | 1200 | 240 | 192 | 80 | — | 10 | 15 |

[1]Heating of tap water, sprayed into chamber from line at 60 p.s.i.g., 80° F., through throttle valve.
[2]Sparge steam heating from ⅜" line, valve opened wide for pump discharge temperatures above 120° F. and temperature controlled by throttling water [1].
[3]Water rate was kept constant at 1200 lb./hr. on all test at 2800 r.p.m. Pump discharger was regulated.

TABLE 2

Laboratory Tests on Peanut Slurries With the Instant, In-Line Slurry System[1]

| Products made from slurries and processes used | Test Code No. | Slurry treatment:[2] Pressure: Chamber 24 | Slurry treatment:[2] Pressure: Hold pipe 50 p.s.i. | Slurry treatment:[2] Heat °F. | Slurry treatment:[2] Hold time sec. | Slurry treatment:[2] Flash[3] | Total solids pct. |
|---|---|---|---|---|---|---|---|
|  |  | in. vac. |  |  |  |  |  |
| Full-fat | SD 1 | 10 | 1 | 150 | 12 | V | 27 |
| peanut | SD 4 | 10 | 1 | 150 | 60 | V | 24 |
| flour | SD 7 | 10 | 1 | 150 | 120 | V | 23 |
| made by | SD 4A | 10 | 1 | 150 | 60 | A | 24 |
| spray drying | SD 2 | 2 | 2 | 205 | 12 | V | 21 |

TABLE 2-continued

Laboratory Tests on Peanut Slurries With the Instant, In-Line Slurry System[1]

| Products made from slurries and processes used | Test Code No. | Pressure: Chamber 24 | Pressure: Hold pipe 50 p.s.i. | Heat °F. | Hold time sec. | Flash[3] | Total solids pct. |
|---|---|---|---|---|---|---|---|
| in laboratory | SD 5 | 2 | 2 | 205 | 60 | V | 22 |
| dryer | SD 8 | 2 | 2 | 205 | 120 | V | 27 |
|  |  | p.s.i. |  |  |  |  |  |
|  | SD 3 | 22 | 24 | 260 | 12 | V | — |
|  | SD 6 | 22 | 24 | 260 | 60 | V | 18 |
|  | SD 9 | 22 | 24 | 260 | 120 | V | 24 |
|  | SD 3A | 22 | 24 | 260 | 120 | A | 26 |
|  | SD 15 | 22 | 24 | 260 | 300 | A | 19 |
|  |  | in. vac. |  |  |  |  |  |
|  | SD 10 | 12 | 1 | None | — | A | 26 |
| Full-fat peanut | DD 13 | 12 | 1 | None | — | A | 34 |
| flakes, made | DD 10 | 12 | 1 | None | — | A | 38 |
| by drum drying. | DD 17 | 12 | 1 | None | — | A | 65[4] |
| Also extruded | DD 28 | 10 | 1 | 150 | 12 | V | 33 |
| and microwave |  | p.s.i. |  |  |  |  |  |
| dried as indicated | DD 12 | 12 | 14 | 240 | 12 | A | 45[4] |
| by footnote[4] | DD 14 | 12 | 14 | 240 | 120 | A | 33 |
|  | DD 19 | 16 | 18 | 250 | 12 | A | 37 |
|  | DD 22 | 16 | 18 | 250 | 4 | A | 45 |
|  | DD 6 | 22 | 24 | 260 | 120 | V | 30 |
|  | DD 9 | 22 | 24 | 260 | 120 | A | 36 |

[1]Full-fat, blanched peanuts, ground to paste in Alpine mill. Slurry mixing, heating, holding as already described. Approximately 8 pounds of ground peanuts per test run, processed at rate of 120 pounds per hour.
[2]Feed line pressures for ground peanuts, water and steam were 40, 60, and 90 p.s.i. respectively. Water pre-heated to 140° F. by in-line heater; supplemental heat by steam infusion into primary mixing chamber 24.
[3]V means flashed to approximately 26 in. vacuum. A means flashed or discharged to atmosphere.
[4]Processed also by extruding and microwave drying.

TABLE 3

Commercial Test Runs on Peanut Slurries with Instant, In-Line Slurry System[1].

| | Example Test Run: | | | |
|---|---|---|---|---|
| | I | II | III | IV |
| Test Code | 9-678 | 9-678-401 | 9-678-401 | 1-2479 |
|  | JR | Va. 2's | Va. 2's | JR |
| Peanuts Processed, Lb. | 1300 | 800 | 950 | 1030 |
| Grind: (Bauer Mill): | | | | |
| Passes through mill | Single | Single | Double | Double |
| Temperature, °F. | 160–180[2] | 160 | 78[3] | 78[3] |
| Consistency | Stiff[2] | Oily | Very oily | Very oily |
| Pump 12 (Moyno 1-L-3)[2]: | | | | |
| Rotor speed, rpm | 290 | 290 | 240 | 285 |
| Rate, Lb./min. | 10[2] | 15 | 14.7 | 15 |
| Hd. pressure, p.s.i. | 45 | 20 | 16 | 40 |
| Mixing, Heating 24,42: | | | | |
| Feed water 28, p.s.i. | 41 | 41 | 41 | 60 |
| Feed water, °F. | 125 | 125 | 125 | 230 |
| Feed water, gpm | 2.6 | 3.7 | 3.6 | 3.4 |
| Steam line 42, p.s.i. | 16 | 16 | 16 | 40 |
| Steam chamber 37, p.s.i. | Neg. | Neg. | 2 | 17 |
| Slurry Tempt. °F. | 150 | 150 | 150 | 250 |
| Pump 66, rpm | 2800 | 2800 | 2800 | 2800 |
| Holding pipe 50 p.s.i. | 4 | 4 | 4 | 18 |
| Holding time, sec. | 7 | 4 | 4 | 4 |
| Slurry solids, pct. | 32 | 33 | 33 | 34 |
| Vacuum Process: | | | | |
| Slurry flash, in. vac. | 26 | 26 | 26 | (Flashed to atmosphere) |
| Water inlet, °F. | 80 | 80 | 80 |  |
| Water outlet, °F. | 88 | 88 | 88 |  |

[1]Full-fat, blanched peanuts. Following flash process, slurries were homogenized and spray dried to produce full-fat flour.
[2]Different lots of peanuts, ground the same, may vary in paste temperature and consistency. An open throat, auger fed pump is needed (instead of the 1-L-3 model) for very viscous pastes, and it will also pump the less viscous pastes well.
[3]Cooled during transportation in drums after grinding.

Having thus described the invention, what I claim and desire to obtain by Letters Patent of the United States is:

1. The method of producing a slurry from peanuts and crop foods, comprising the steps of:
   (a) continuously reducing said nuts to a paste form,
   (b) continuously forming said paste into a strand,
   (c) continuously delivering said strand along a first path adjacent a foraminous support,
   (d) continuously delivering under pressure a flow of liquid along a second path generally perpendicular to and intersecting said first path whereby said strand is forced through said support and mixed with said liquid to break up glomerates of ground nuts and to emulsify the oil content of said nuts, said mixing forming a slurry, and
   (e) pumping said slurry away from said support at a rate sufficient to prevent the flooding of said support and to maintain a relatively low pressure zone proximate to said support.

2. The method of claim 1 including the step of pumping said slurry through a foraminous member having openings therein smaller than those in said support.

3. The method of claim 1 wherein said liquid is heated.

4. The method of claim 3 wherein said slurry is pumped along a dwell path for a time sufficient for the heat of said liquid in said slurry to penetrate the peanut material in said slurry.

5. The method of claim 4 including the step of rapidly cooling said slurry after said slurry has passed through said dwell path.

6. The method of claim 4 including the step of flashing said slurry from said dwell path into a vacuum whereby said slurry will be rapidly cooled.

7. The method of claim 1 including the step of mixing steam with said liquid proximate to said second path.

8. The method of claim 5 including the step of drying said slurry.

9. The method of claim 5 wherein said slurry is heated to a sufficient temperature and for a sufficient period of time to inactivate enzymes present in said slurry without damaging the proteins therein.

10. The method of claim 7 wherein said water and steam are formed into a cone.

11. The method of claim 1 wherein said slurry is formed under relatively low pressure conditions and pumped under relatively high pressure conditions.

12. The method of claim 1 wherein said slurry is flash heated to a temperature up to 320° F. and the peanut content of said slurry is in the range of 1 to 65%.

13. The method of claim 1 wherein said paste is heated to a temperature in the range of 145° to 170° F.

* * * * *